Sept. 5, 1961  T. L. SMITH  2,998,629
PIPE CLAMP
Filed Feb. 25, 1958  3 Sheets-Sheet 1
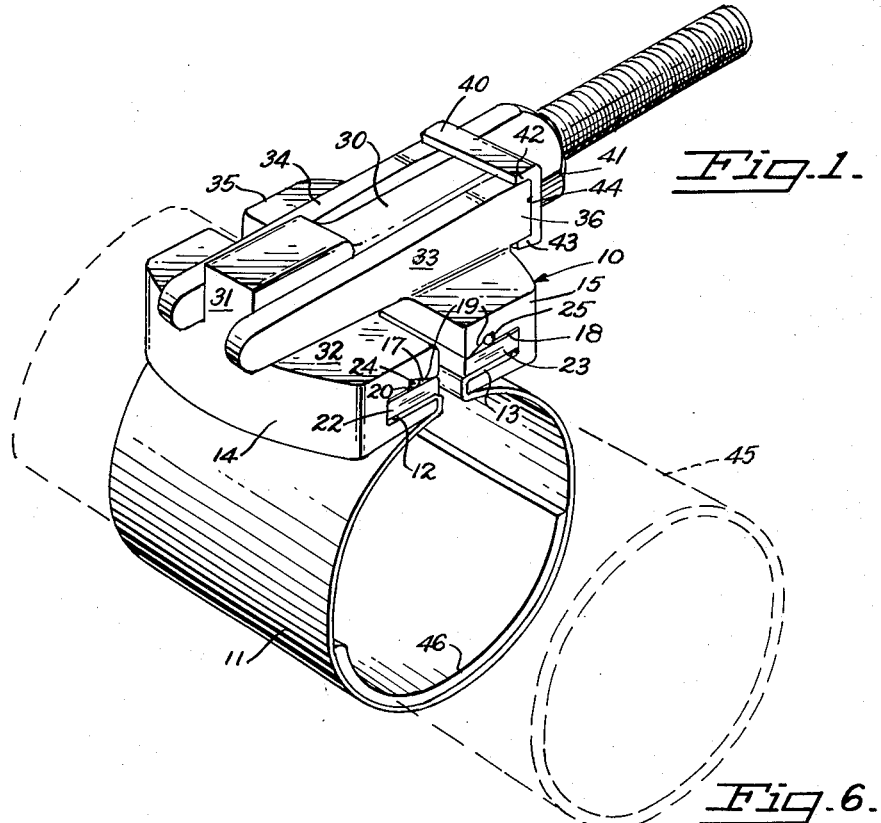
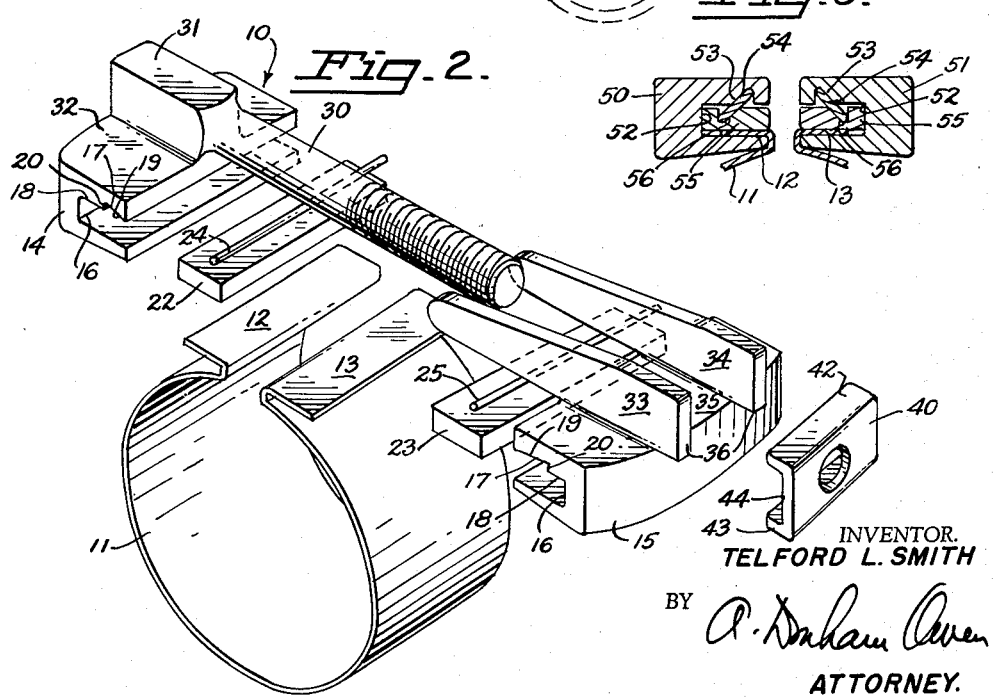
INVENTOR.
TELFORD L. SMITH
BY
ATTORNEY.

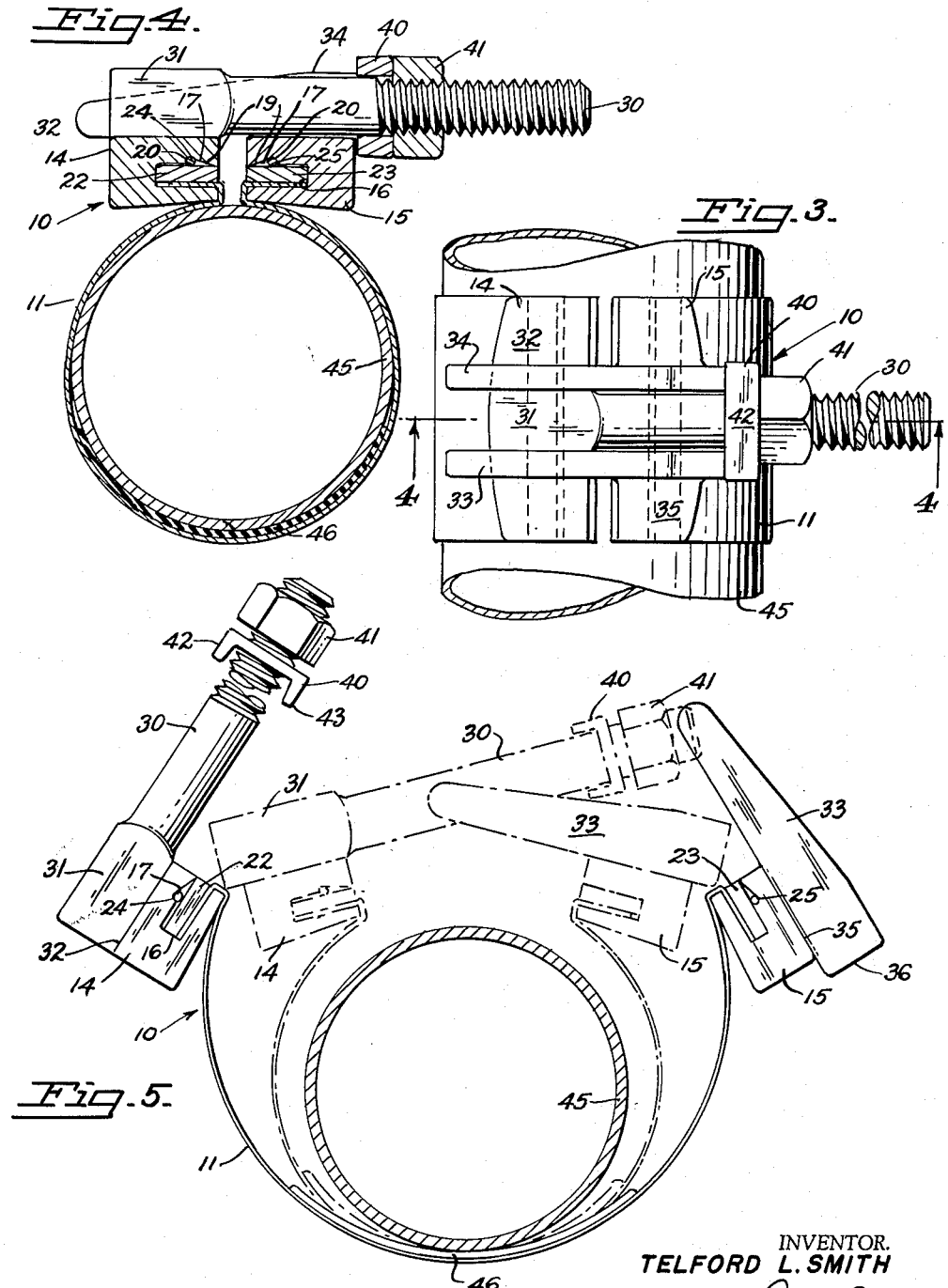

Sept. 5, 1961 T. L. SMITH 2,998,629
PIPE CLAMP
Filed Feb. 25, 1958 3 Sheets-Sheet 3
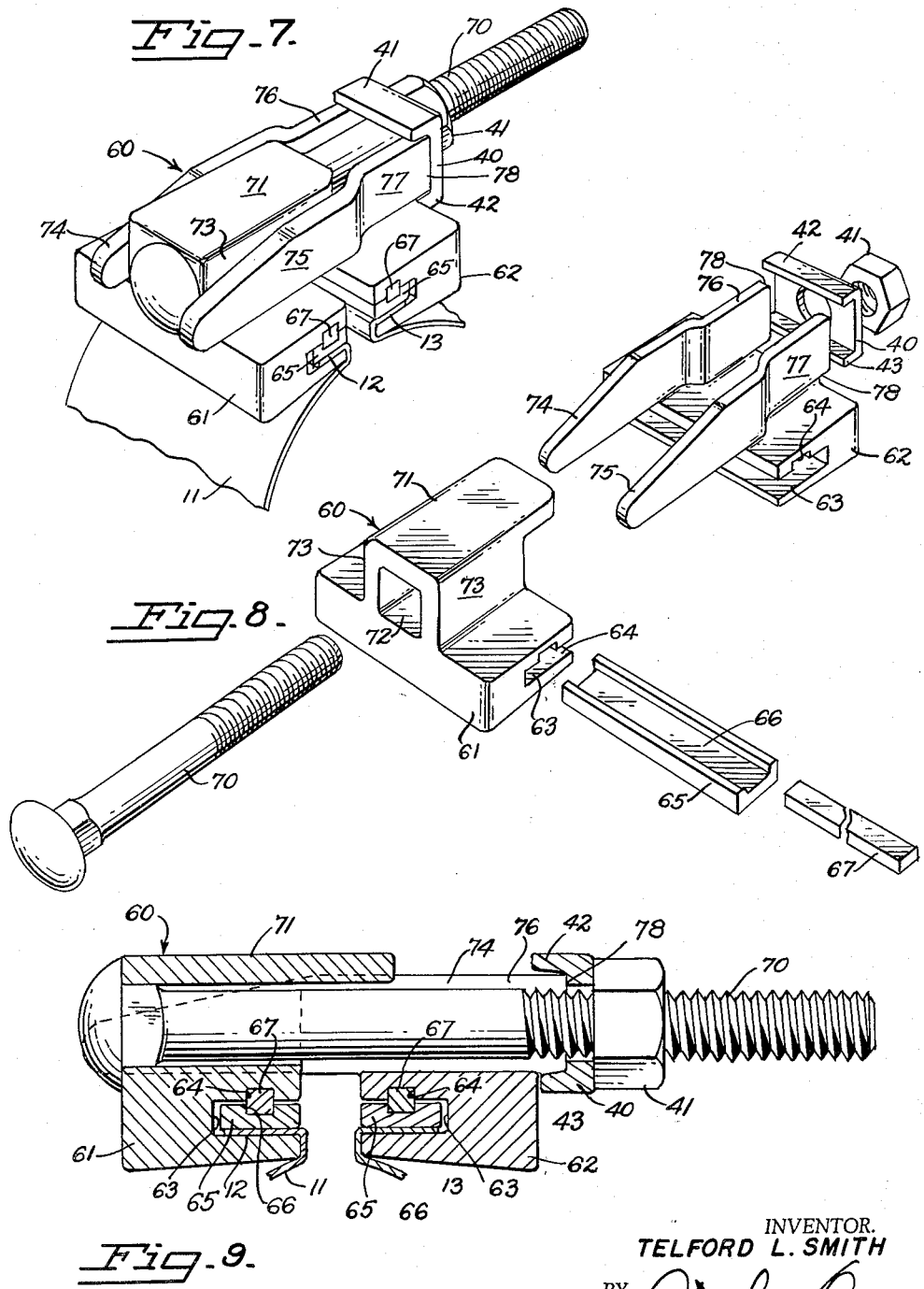
INVENTOR.
TELFORD L. SMITH
BY 
ATTORNEY

United States Patent Office 2,998,629
Patented Sept. 5, 1961

2,998,629
PIPE CLAMP
Telford L. Smith, 567 Magnolia Ave.,
South San Francisco, Calif.
Filed Feb. 25, 1958, Ser. No. 717,493
13 Claims. (Cl. 24—279)

This invention relates to an improved pipe clamp of the type in which rigid lugs are used to secure together the ends of a malleable band that goes around the pipe. More particularly, the invention relates to the structure of the lugs for such a pipe clamp.

How to assure a tight securing of the ends of the bands to the lugs of a malleable-band type of pipe clamp has long been a problem. The present invention solves this problem by a novel type of wedging structure that achieves a firm anchorage of the band ends.

Another very difficult problem has been to get the bolts aligned in the lugs during installation and, once they are aligned, to keep them from bending as the nuts are tightened on them, for as the lugs are tightened, a considerable bending moment is usually applied. The present invention also solves this problem by a novel lug structure which makes it possible to put a keeper member and the nut on the end of the bolt before the lug members are secured together, then to align the lug members freely and easily. The keeper member and the other parts cooperate to retain correct alignment during the final tightening of the bolt, without applying a severe bending moment to the bolt.

It has long been a problem to provide a clamp with a band which will completely encircle the pipe and at the same time with lugs having a bolt slot for quick assembly of the clamp under field conditions. This problem has been solved by the present invention.

Clamps with a metal band passing under the lug have provided a maximum of encirclement of the pipe and a minimum of gouging action or concentrated pressure under the lug, but with these advantages, they have had the disadvantages of transferring the tilting action of the lug, caused by the metal pulling from underneath the lug and from in front of the lug, to the bolt, thereby creating a bending moment or stress.

Clamps with full encirclement required that the bolt be pushed through holes in the lug and the nut screwed on after the bolt had passed through the holes. Clamps with a slotted type of lug had been pre-assembled with a bolt passing through the hole in one lug and through a slot in the opposite lug, with the nut and washer in place on the bolt when the bolt was dropped in the slot.

Heretofore, in clamps with lugs in which the bolts could be dropped through a slot, the metal was attached to the bottom and to the back of the lug, or metal bands passed over the top of the lug, down in front of the lug, and then underneath the lug. In both types of slotted-lug clamps the lugs concentrated considerable pressure against the pipe as a result of leverage caused by the bolts pulling on the lugs. The slotted type of lug could be used only if the pipe was of sufficient strength to withstand this concentrated pressure of the lug against the pipe. It is obvious that in many cases, pipe which needs repairing is in such a fragile condition that a clamp which exerts concentrated pressure on one area would not be satisfactory even though it could be installed quickly. In the past, the question has been as to whether to use a clamp which would completely encircle the pipe with a minimum of stress on the pipe, or to use the slotted type of clamp with the advantage of faster installation. These structures were mutually exclusive; no one clamp was capable of both actions.

My new clamp has all the advantages of both of these old type of clamps, plus the advantage of placing a straight pull on the bolt. The bolt can be dropped through a slot and cannot be jarred out of place because of a U-shaped washer. In my new clamp two arms on one lug extend over the top of the opposite lug and bear down on the back and top of the opposite lug in a manner that helps to neutralize the tilting movement of both lugs. The bolt also has a support over a portion of the bridging part, and the bolt and the extending arms of the opposite lug press on the top and back of the lug. In other words, the bolt also acts as a neutralizer of the tilting forces, and when all forces are taken into consideration and neutralized to the maximum, the bolt receives a minimum for any bending stress.

Other objects and advantages of the invention will appear from the following description of some preferred embodiments thereof.

In the drawings:

FIG. 1 is a view in perspective of a pipe clamp embodying the principles of the invention shown in its installed position. The position of the pipe itself is shown in broken lines.

FIG. 2 is an exploded perspective view of the clamp of FIG. 1, looking from a viewpoint approximately 90° thereto.

FIG. 3 is a top plan view of the tightened clamp of FIG. 1, with the pipe shown in solid lines but with its ends broken off.

FIG. 4 is a view in end elevation and in section of the tightened clamp, taken along the line 4—4 in FIG. 3.

FIG. 5 is a view in end elevation illustrating the installation of the clamp about the pipe, showing in solid lines the initial position prior to installation and, in broken lines, an intermediate position.

FIG. 6 is a view in end elevation and in section through a pair of lugs like those of the clamp of FIG. 1, showing a modified form of wedge structure. All except the end portions of the malleable band have been broken off in order to conserve space.

FIG. 7 is a view in perspective of the lug and adjacent portions of a tightened pipe clamp embodying a modified form of the invention, the major portion of the malleable band having been broken off in order to conserve space.

FIG. 8 is an exploded perspective view of the clamp of FIG. 7.

FIG. 9 is an enlarged view in end elevation and in section of the tightened clamp of FIG. 7.

The clamp 10 shown in FIGS. 1 through 5 incorporates a malleable band 11 whose ends 12 and 13 are preferably bent over for installation in two lugs 14 and 15. Each lug 14, 15 has an open slot 16, which is generally rectangular in cross section except for a wedge-shaped recess 17 in its upper surface 18 formed by an upwardly sloping surface 19 and a short vertical end wall 20. The ends 12 and 13 are inserted in the slots 16 and held clamped thereby respective bars 22 and 23 and by round wires 24 and 25, stiff and of large diameter. The bars 22 and 23 fill the slot 16 except for the recess 17, and the wires 24 and 25 are wedged therein. Any force acting to pull either the bars 22 and 23 of the band ends 12 and 13 out from the slot 16 acts to tighten the wedging of the wires 24 and 25 in the wedge recess 17 and so to hold the band ends 12 and 13 still more tightly.

The lug 14 is provided with an integral bolt member 30 preferably having a rectangular head portion 31 atop the upper surface 32 of the lug 14. The other lug 15 is provided with a pair of parallel guide members 33 and 34 projecting out from atop its upper surface 35 and having rectangular rear ends 36. So when the lug 14 is rotated relatively to the lug 15 (as shown in FIG. 5), the bolt member 30 fits in between the guides 33 and 34, the rectangular head 31 fitting snugly between the guides 33 and 34 to assure alignment thereof, when they are in the position shown in FIGS. 1, 3, and 4.

A keeper locking washer or follower 40 and a nut 41 may be inserted on the end of the bolt 30 before such rotation. The locking washer 40 has upper and lower flanges 42 and 43 defining a rectangular channel 44 and of a size to clamp over the upper and lower edges of the rear ends 36 of the guides 33 and 34, when slipped lengthwise along the bolt 30. When in place, the washer 40 locks the bolt member 30 to the guides 33 and 34 and assures the proper lateral distribution. All that need remain to be done then is to tighten the nut 41. When the clamp 10 is inserted on a pipe 45, as shown in FIG. 5, alignment is rapid. Tightening of the nut 41 tightens the band 11 and its gasket 46 against the pipe walls, and the locking washer 40 serves as a bearing and aligning member, cooperating with the guides 33 and 34 to resolve any bending moment between them instead of on the bolt 30.

The installation of the clamp 10 is very simple. The ends 12, 13 of the band are fitted into their respective lugs 14 and 15, the clamp bars 22 and 23 being put in over them, and the wedge wires 24 and 25 are driven into the wedge slots 17 by a hammer. The keeper washer 40 is then slipped over the bolt 30 and the nut 41 placed on the very end of the bolt 30, giving a wide amount of play. Then the lugs 14 and 15 are spread apart and slipped over the pipe 45 in the position shown in solid lines in FIG. 5. They are brought up around the pipe 45 and then are moved inwardly, and the bolt 30 is then fed down in between the guides 33 and 34 of the opposite lug 15. When the bolt 30 is in place laterally, the keeper washer 40 is slid along to engage its flanges 42 and 43 around the ends 36 of the guide members 33 and 34. Then the nut 41 is tightened into place. The bolt 30 will not be bent during tightening as in the prior art because of the action of the keeper 40 and because there is a pivoting action between the lugs 14, 15 and the malleable band 11.

In FIG. 6, the lugs 50 and 51 have a slot 52 and a wedging recess that slopes in the opposite direction from the recess 17 of FIGS. 1-5. Also, each wedging member 54 instead of being a round wire 24 or 25, is a stiff flat bar, and the clamp members 55 are each provided with a sloping recess 56 adapted to receive the bar 54 and hold it at an angle of about 45° to the horizontal, as shown in FIG. 6, so that the wedge bar 54 bridges the corners of the two recesses 52 and 56. Any attempt to pull the clamping members 55 or band ends 11 and 12 out will merely result in a tighter wedging action.

FIGS. 7-9 show a modified clamp 60 also embodying the invention. Lugs 61 and 62 are provided with slots 63, having rectangular recesses 64. When the band ends 12 and 13 are inserted into the slots 63, they are clamped there by bars 65 having a channel 66 in their upper surface. A rectangular locking bar 67 is driven in by hammer so as to bridge the channel 66 and the recess 64 and thereby lock the band ends 12 and 13 in place.

In this form of the invention a separate carriage bolt 70 is used in place of the integral bolt 30. For this purpose the lug 61 has a boss 71 with a rectangular bolt opening 72 that keeps the bolt 70 from turning and with rectangular sides 73 adapted to engage between outspread guides 74 and 75. The bolt 70 extends between narrowed portions 76 and 77 of the guides 74 and 75, which terminate in end edges 78. The washer 40 and nut 41 are used as before.

Operation is substantially the same as before except that here the bolt 70 is inserted into its opening 72 and the keeper 40 and nut 41 placed thereon, preferably before the clamp 60 is placed around the pipe, so that the operation can then be very quick. Again, the keeper washer 40 engages the ends 78 of the side guides 74 and 75 and holds the bolt 70 in place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pipe clamp, comprising a malleable band, a pair of lugs, each lug having a slot in which the ends of said band are inserted and a recess parallel to and connected to said slot, on one side of said slot and extending substantially the full length of said slot, one said lug having a planar outer surface and means supporting bolt means projecting above said planar surface and the other a pair of guides for aligning said bolt means with lower edges engaging said planar surface to prevent bending of said bolt, said engagement therefore lying closer to the pipe than said bolt; a clamp bar in each said slot; a wedging member in said recess and engaging said bar; a keeper follower movable on said bolt means to engage said guides and prevent relative rotation between said lugs; and a nut tightened on said bolt means against said follower.

2. The clamp of claim 1 wherein said bolt means comprises an integral part of said one lug, having a rectangular head portion that fits in between said guides and engages them to prevent relative lateral movement.

3. The clamp of claim 1 wherein said one lug has a rectangular boss adapted to fit in between said guides and engage them and said lug having an opening through which said bolt means extends and in which it is keyed, said bolt means being a carriage bolt.

4. The clamp of claim 1 wherein said clamp bar is rectangular, said recess is triangular in cross section, and said wedging member is a stiff wire.

5. The clamp of claim 1 wherein said clamp bar is rectangular and has a triangular recess therein with one wall sloping and the other vertical, said recess in said lug having also a triangular shape in cross section with one wall sloping parallel to the aforesaid sloping wall and the other vertical, and wherein said wedging member comprises a stiff bar bridging said recesses.

6. The clamp of claim 1 wherein said recess is generally rectangular, said clamp bar is rectangular with a rectangular channel therein and said wedging member is a rectangular bar bridging said recess and said channel.

7. In a pipe clamp of the type employing a malleable band, a pair of lug assemblies, and means for tightening the lugs together, the novel structure wherein each said lug assembly, comprising a lug having a slot in which the ends of said band are inserted and a recess opening into said slot on one side of said slot and extending substantially the full length of said slot; a clamp bar in each said slot; and a wedging member in said recess engaging said bar.

8. The device of claim 7 wherein said clamp bar is rectangular in cross section, said recess is triangular in cross section, and said wedging member is a stiff wire.

9. The device of claim 7 wherein said clamp bar is rectangular and has a triangular recess therein with one wall sloping and the other vertical, said recess in said lug having also a triangular shape in cross section with one wall sloping parallel to the aforesaid sloping wall and the other vertical, and wherein said wedging member comprises a stiff bar bridging said recesses.

10. The device of claim 7 wherein said recess is generally rectangular, said clamp bar is rectangular with a rectangular channel therein and said wedging member is a rectangular bar bridging said recess and said channel.

11. A pipe clamp, comprising a malleable band, a pair of lugs, each lug having means for clamping thereto the ends of said band, one said lug having a planar outer surface and means supporting bolt means projecting above said planar surface and the other a pair of guides for aligning said bolt means with lower edges engaging said planar surface to prevent bending of said bolt, the engagement of said lower edges with said planar surface being closer to the pipe than said bolt; a keeper follower movable on said bolt means to engage said guides and prevent relative rotation between said lugs; and a nut tightened on said bolt means against said follower.

12. The clamp of claim 11 wherein said bolt means comprises an integral part of said one lug, having a rectangular head portion that fits in between said guides and engages them to prevent relative lateral movement.

13. The clamp of claim 11 wherein said one lug has a rectangular boss adapted to fit in between said guides and engage them and an opening through which said bolt means extends and in which it is keyed, said bolt means being a carriage bolt.

References Cited in the file of this patent

UNITED STATES PATENTS

| | | |
|---|---|---|
| 1,028,150 | Taylor | June 4, 1912 |
| 1,367,071 | Mazzanovich | Feb. 1, 1921 |
| 1,629,246 | Arrington | May 17, 1927 |
| 1,907,889 | Stauffer | May 9, 1933 |
| 2,625,354 | Smith | Jan. 13, 1953 |
| 2,816,343 | Decker | Dec. 17, 1957 |
| 2,834,086 | Smith et al. | May 13, 1958 |
| 2,897,568 | Hoke | Aug. 14, 1959 |